United States Patent [19]

Cleveland et al.

[11] Patent Number: 5,222,250
[45] Date of Patent: Jun. 22, 1993

[54] SINGLE SIDEBAND RADIO SIGNAL PROCESSING SYSTEM

[76] Inventors: John F. Cleveland, 10523 39th Dr. NE., Marysville, Wash. 98270; Jay M. Fassett, 7612 202nd St. SW., Edmonds, Wash. 98026; Mark D. Peterson, 4548 4th Ave. NE., Seattle, Wash. 98105

[21] Appl. No.: 863,431

[22] Filed: Apr. 3, 1992

[51] Int. Cl.$^5$ .................. H04B 1/68; H04B 1/00
[52] U.S. Cl. ................... 455/47; 455/56.1; 455/109; 332/170
[58] Field of Search ........... 455/47, 48, 68, 54.2, 455/56.1, 109; 380/6, 15, 31, 39; 370/111; 332/170

[56] References Cited

U.S. PATENT DOCUMENTS

| | | |
|---|---|---|
| 1,677,224 | 7/1928 | Affel . |
| 1,969,239 | 8/1934 | Runge . |
| 1,997,407 | 4/1935 | Hofer . |
| 2,011,566 | 8/1935 | Black . |
| 2,034,497 | 3/1936 | Travis . |
| 2,133,410 | 10/1938 | Wirkler . |
| 2,219,749 | 10/1940 | Oswald . |
| 2,219,751 | 10/1940 | Polkinghorn . |
| 2,245,598 | 6/1941 | Llewellyn . |
| 2,250,172 | 7/1941 | Wilson . |
| 2,271,522 | 2/1942 | Luck . |
| 2,298,930 | 10/1942 | Decino . |
| 2,877,423 | 3/1959 | Webster . |
| 2,907,831 | 10/1959 | De Jager et al. . |
| 2,928,055 | 3/1960 | Weaver, Jr. . |
| 3,005,094 | 10/1961 | Taylor . |
| 3,017,508 | 1/1962 | Kious . |
| 3,042,867 | 7/1962 | Thompson . |
| 3,104,393 | 9/1963 | Vogelman . |
| 3,271,681 | 9/1966 | McNair . |
| 3,275,940 | 9/1966 | Kahn . |
| 3,528,012 | 9/1970 | Kahn . |
| 3,634,766 | 1/1972 | Boyer . |

(List continued on next page.)

FOREIGN PATENT DOCUMENTS 2168223B 6/1988 United Kingdom .

OTHER PUBLICATIONS

J. P. McGeehan; |The Application of TTIB Linear Modulation To Land Mobile Radio And Mobile-Satellite Communications|; Sep. 1990; All.
U.S. Pat. application Ser. No. 128,842—Transparent Tone-In Band Transmitters, Receivers, And Systems.
U.S. Pat. application Ser. No. 129,856—Data Transmission Using A Transparent Tone-In Band System.

Primary Examiner—Reinhard J. Eisenzopf
Assistant Examiner—P. Sobutka
Attorney, Agent, or Firm—Hughes & Multer

[57] ABSTRACT

A single sideband radio system. The system comprises a transmitter and a receiver. The transmitter comprises a transmitter baseband processing portion for generating a first baseband signal comprising first, second, and pilot components and modulating the first baseband signal in inverse proportion to the strength of the first component of the first baseband signal and an RF output stage for generating and transmitting a single sideband signal comprising first, second, and pilot portions corresponding to the first, second, and pilot components of the modulated first baseband signal. The receiver comprises an RF input stage for receiving the single sideband signal and a receiver baseband processing portion for generating a second baseband signal comprising first, second, and third components corresponding to the first, second, and third portions of the single sideband signal and for correcting the second baseband signal based on the pilot component of the second baseband signal.

29 Claims, 11 Drawing Sheets

U.S. PATENT DOCUMENTS

| | | | |
|---|---|---|---|
| 3,686,574 | 8/1972 | Niman | 325/421 |
| 3,900,823 | 8/1975 | Sokal et al. | 330/149 |
| 3,927,420 | 12/1975 | Hayashi et al. | 360/65 |
| 4,243,955 | 1/1981 | Daniel et al. | 332/37 |
| 4,313,211 | 1/1982 | Leland | 455/139 |
| 4,481,672 | 11/1984 | Watkinson | 455/108 |
| 4,539,707 | 9/1985 | Jacobs et al. | 455/47 |
| 4,541,118 | 9/1985 | Eastmond et al. | 455/35 |
| 4,596,046 | 6/1986 | Richardson et al. | 455/260 |
| 4,618,999 | 10/1986 | Watkinson | 455/108 |
| 4,679,243 | 7/1987 | McGeehan et al. | 455/47 |
| 4,682,119 | 7/1987 | Michel | 330/149 |
| 4,691,375 | 9/1987 | McGeehan et al. | 455/71 |
| 4,691,377 | 9/1987 | Yoshihara et al. | 455/256 |
| 4,706,262 | 11/1987 | Ohta | 375/60 |
| 4,726,051 | 2/1988 | Schuermann | 379/60 |
| 4,775,995 | 10/1988 | Chapman et al. | 379/58 |
| 4,802,191 | 1/1989 | McGeehan et al. | 375/43 |
| 4,811,423 | 3/1989 | Eastmond | 455/207 |
| 4,921,467 | 5/1990 | Lax | 455/264 |
| 4,932,072 | 6/1990 | Toko | 455/76 |
| 4,947,453 | 8/1990 | McGeehan et al. | 455/47 |

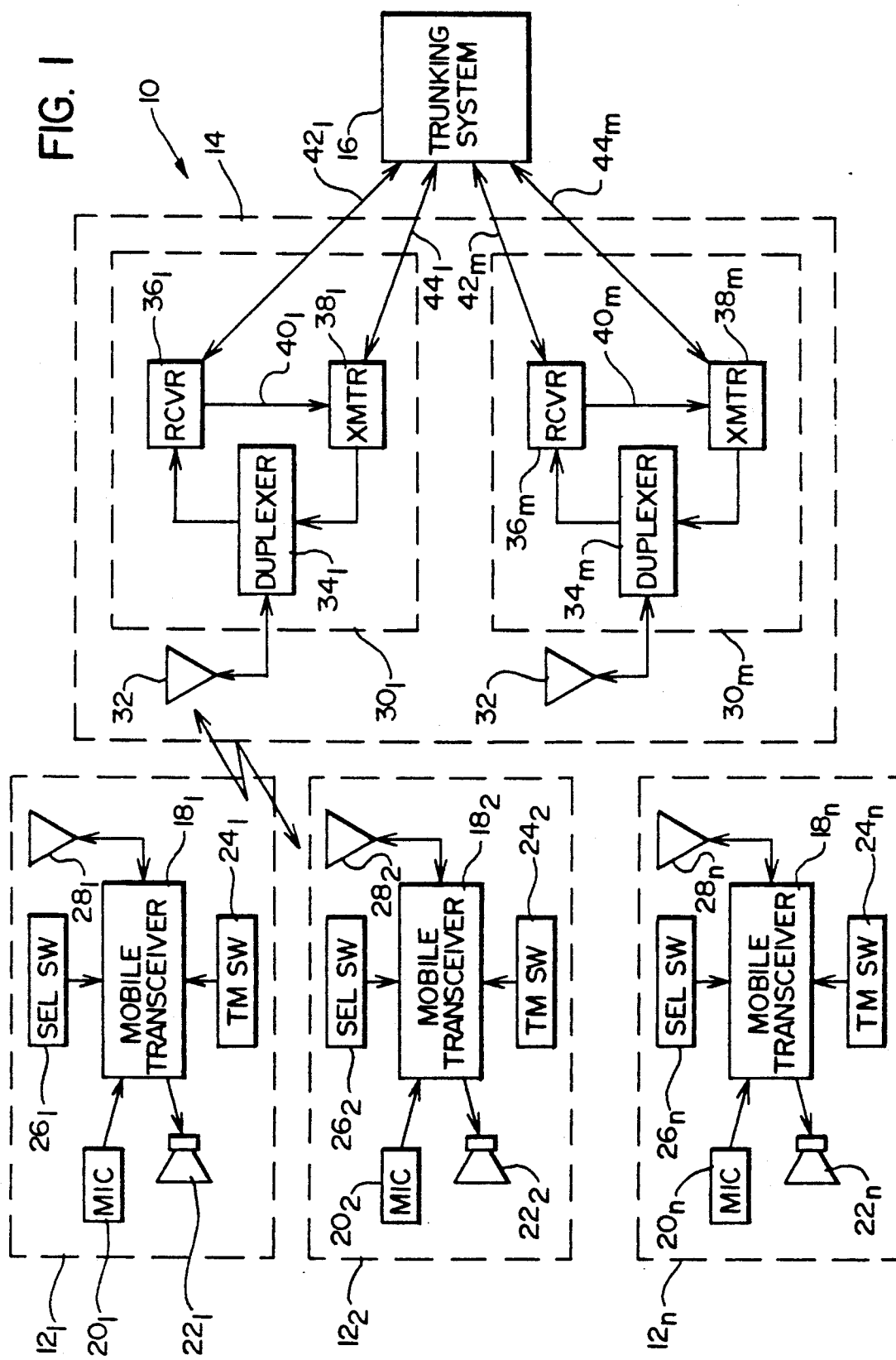

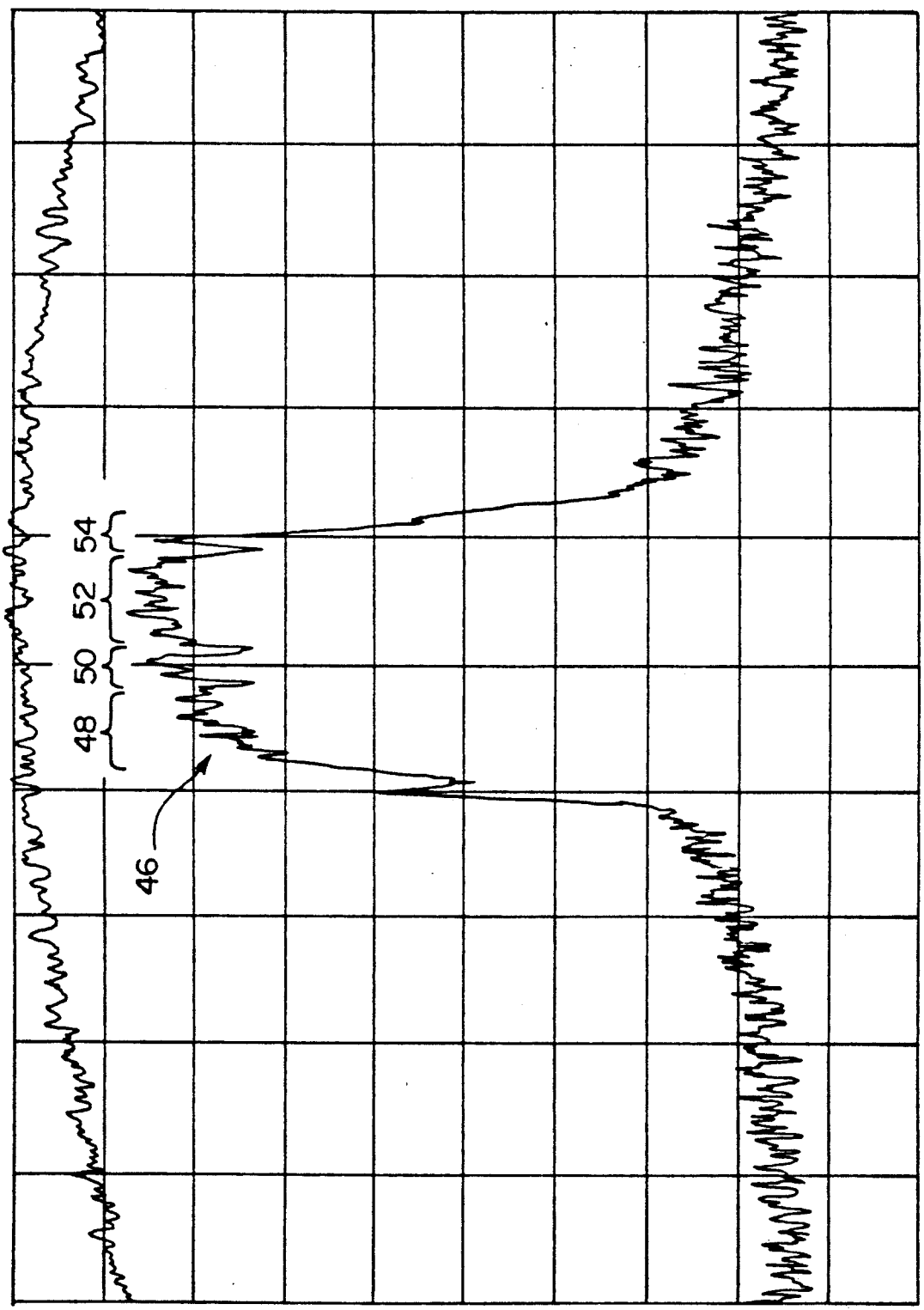

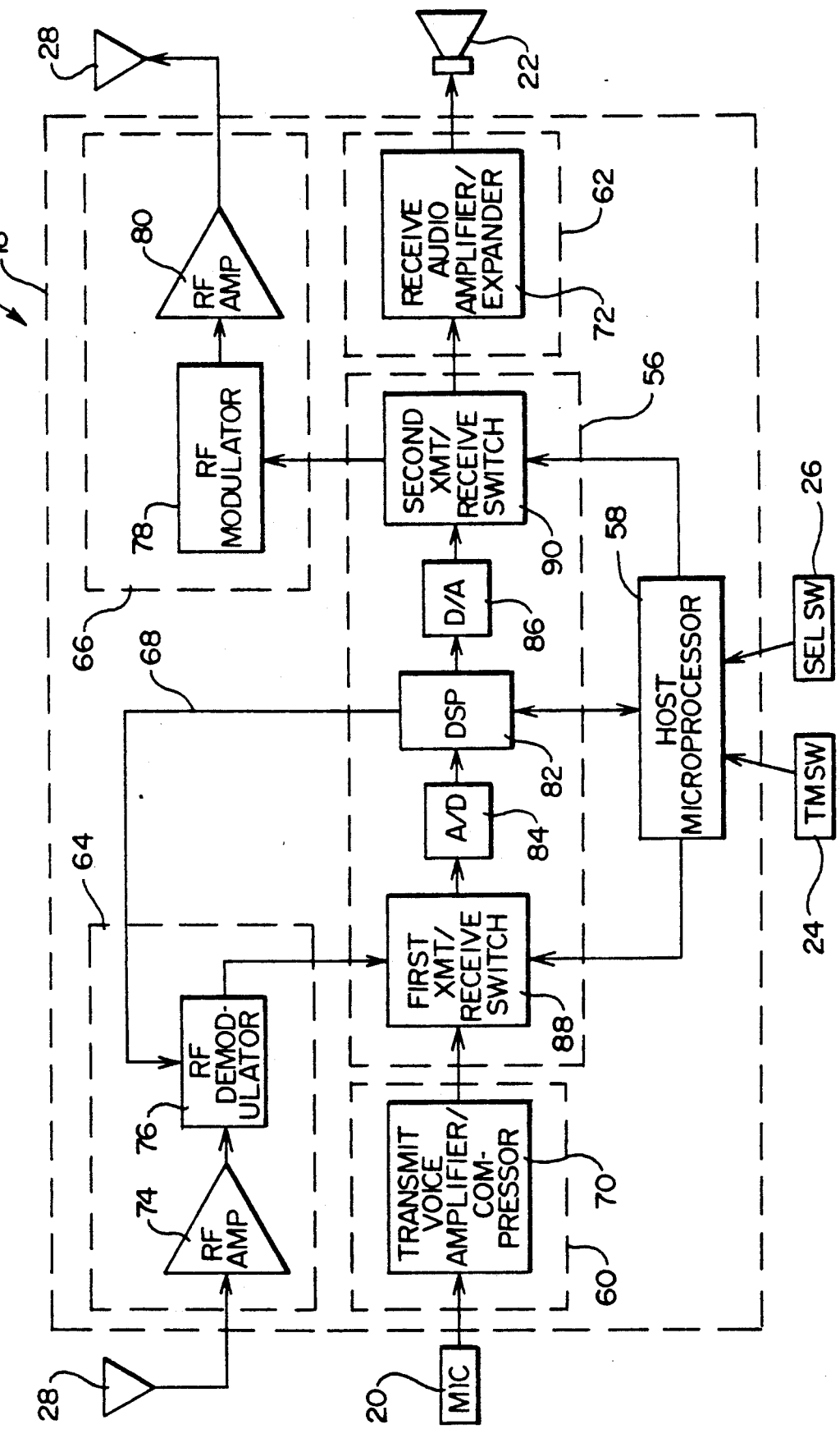

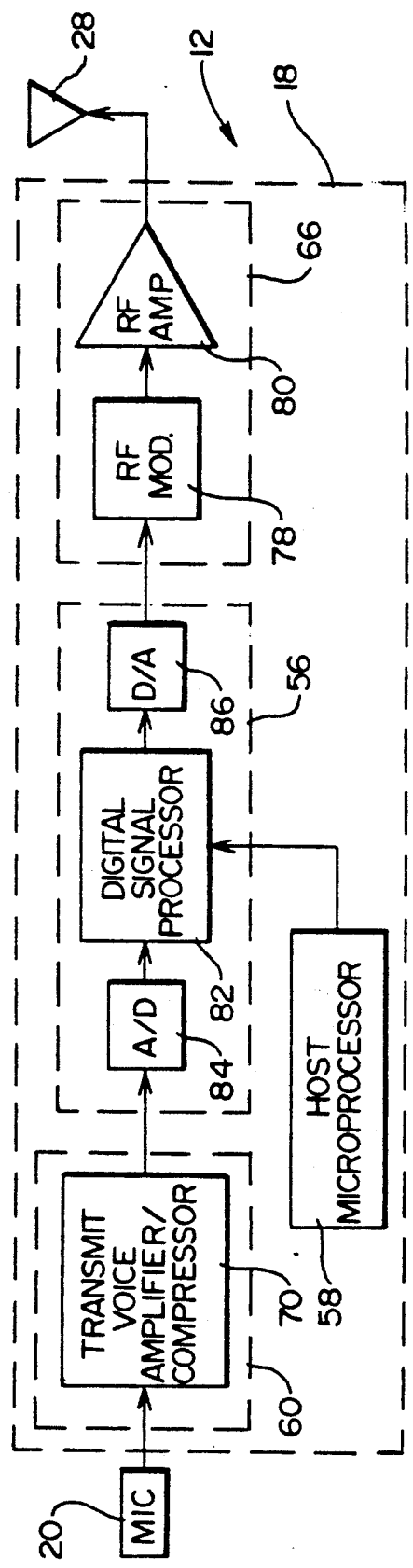
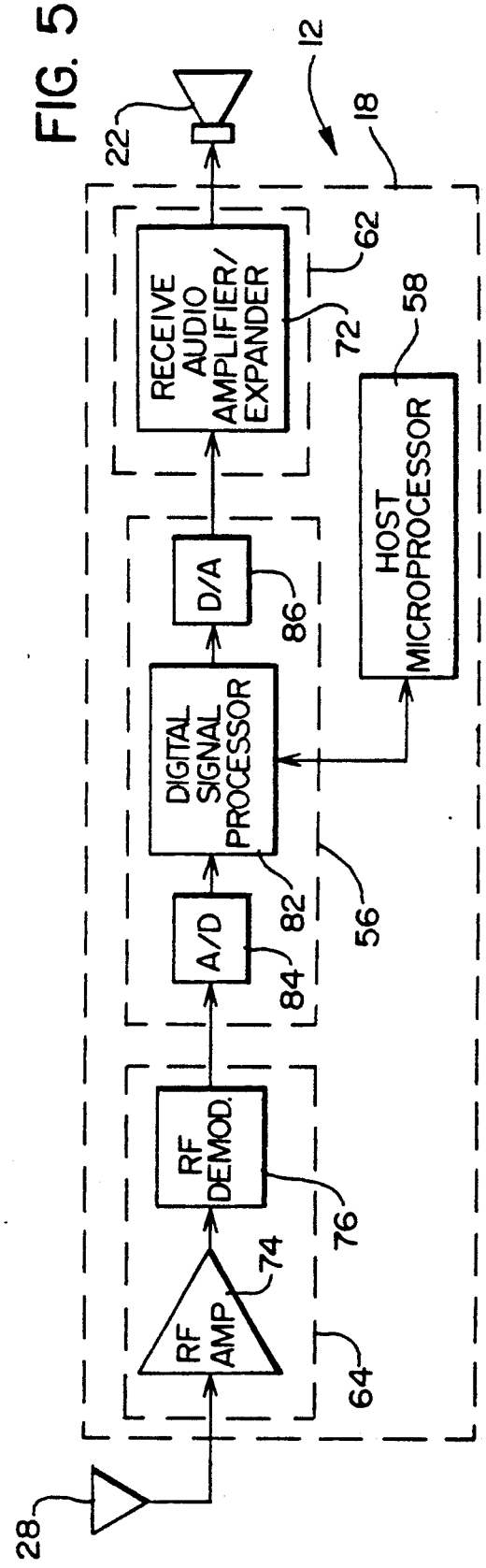

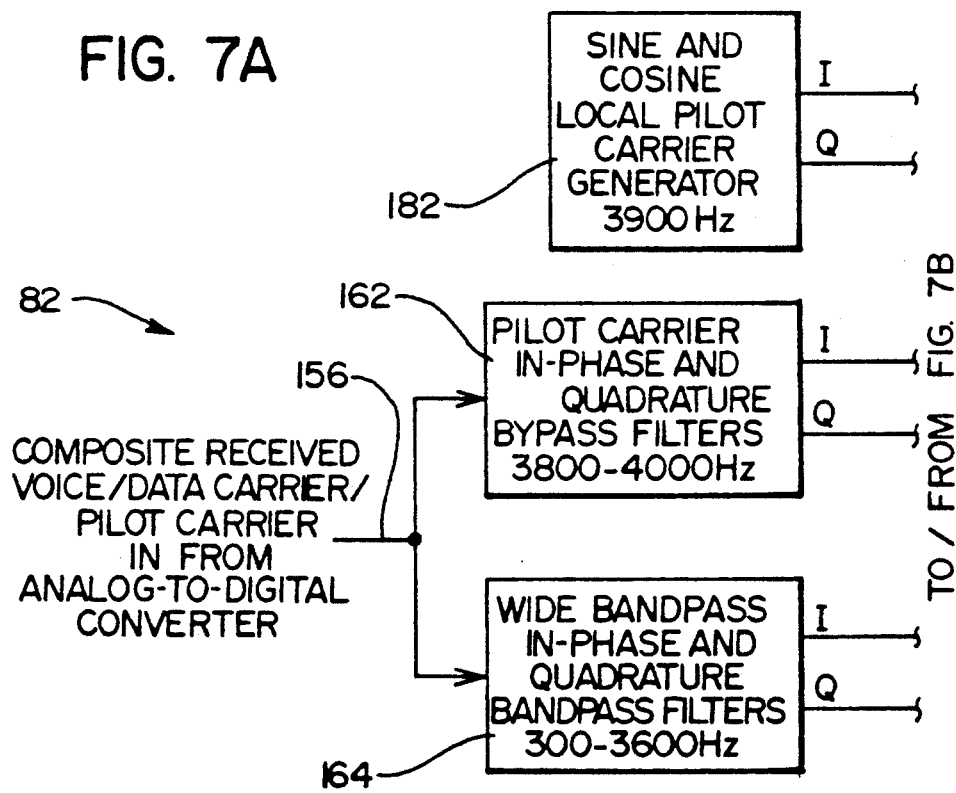

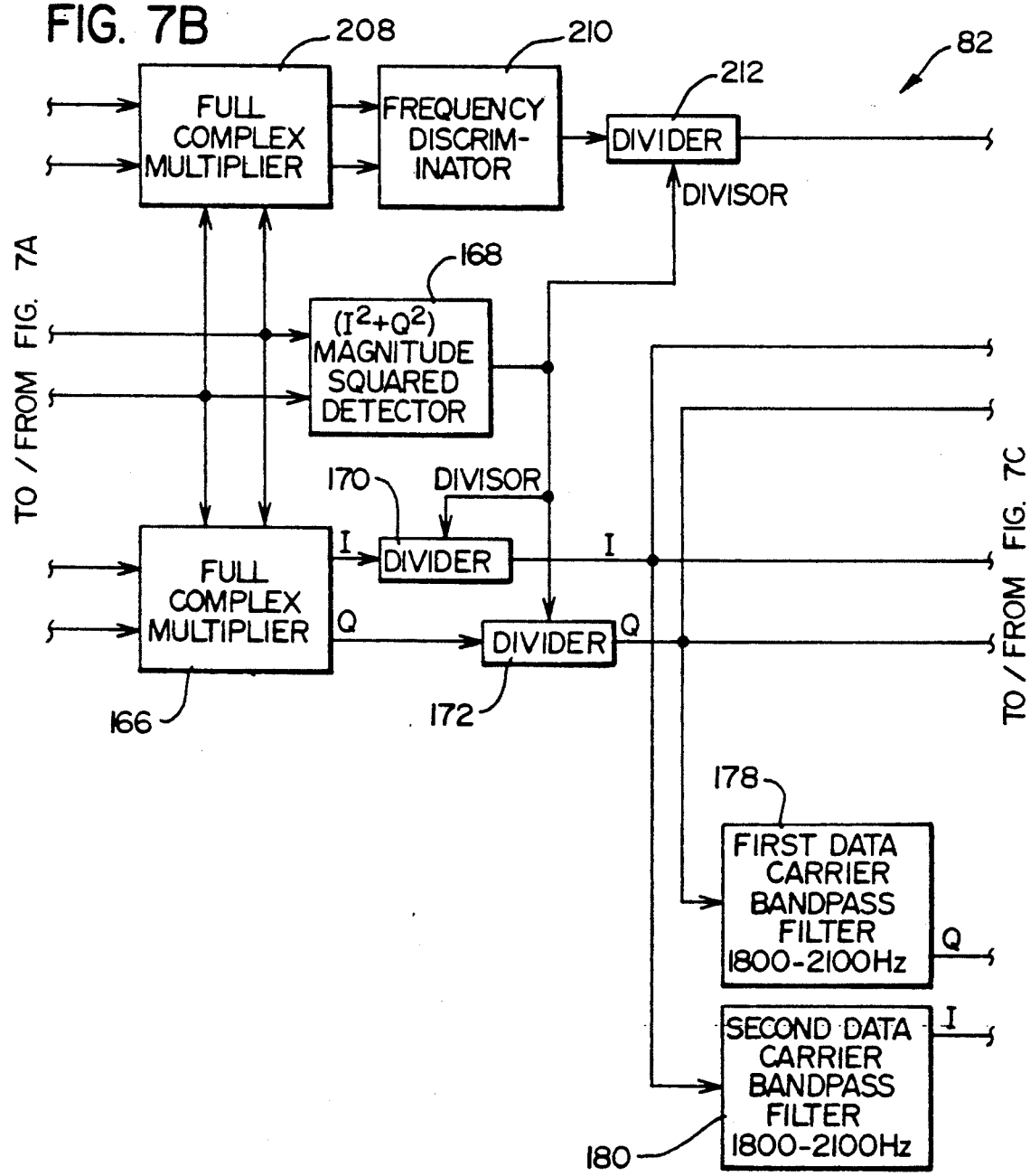

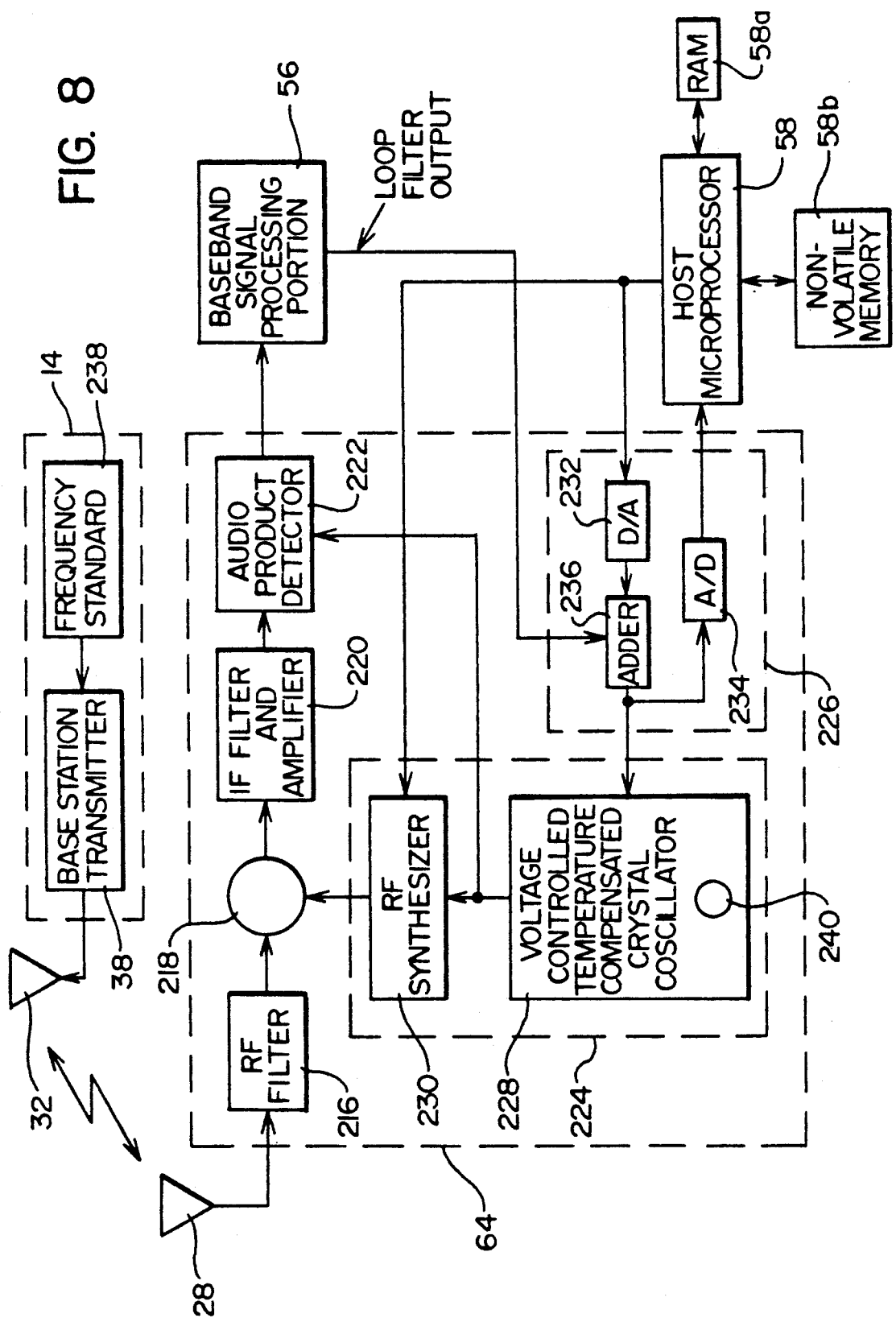

SINGLE SIDEBAND RADIO SIGNAL PROCESSING SYSTEM

TECHNICAL FIELD

The present invention relates to radio transceivers and, more particularly, to amplitude compandored single sideband radio transceivers designed for use in a trunked communications system.

1. Background of the Invention

Recognizing that the radio spectrum is finite, the Federal Communications Commission (FCC) encourages the development and use of technology that makes efficient use of the radio spectrum. To this end, the FCC has recently allocated a region of the radio spectrum from 220-222 MHz for the purpose of spurring the development and acceptance of new narrowband technologies. The 220-222 MHz range allocated by the FCC is divided up into 400 5 kHz-wide frequency ranges paired to provide 200 channels.

The present invention relates to a spectrum efficient narrowband technology designed to operate efficiently in this 220-222 MHz range, and that application of the present invention will be discussed in detail below; however, it should be clear that the principles of the present invention may be adapted to operate efficiently in frequency ranges other than 220-222 MHz. Accordingly, the scope of the present invention should be determined with reference to the claims appended hereto and not the following detail discussion.

To increase efficient use of the available channels, narrowband technologies developed for use in the allocated range should allow the implementation of channel trucking. Channel trucking systems require the simultaneous transmission of voice data and trunking control data. The trunking control data carries information such as channel availability, transmitter and receiver identification codes, and transmitter priority. This information may be processed by transmitters, receivers, and trunking systems in a manner that results in more efficient utilization of available spectrum.

2. Prior Art

Single Sideband (SSB) suppressed carrier amplitude modulated radio techniques are of interest in the development of new narrowband technologies because SSB signals occupy an inherently narrow region of the radio spectrum. A conventional SSB system operates basically as follows. The baseband voice signal is first used to amplitude modulate a carrier signal. The output of the mixer is then filtered to select one sideband thereof and suppress the carrier. The resulting signal is then amplified and transmitted to a receiver. The receiver demodulates the transmitted signal back down to baseband and recovers the voice signal. Because only one sideband is transmitted, more efficient use of the radio frequency spectrum is achieved.

Although SSB is relatively spectrum efficient, a conventional SSB system as described above is not optimized for land/mobile vehicular communications. The peak-to-average power ratio of conventional SSB signals as just described is unacceptably high, and highly precise receiver tuning is required because the carrier is not recoverable at the receiver. Additionally, trunking is not easily accommodated in SSB systems because the SSB signal does not contain space for trunking control data. Placing the trunking control data in the subaudible portion of the voice signal, as is done for example in certain radio telephone systems, is not considered to be viable in SSB systems.

Amplitude Compandored Single Sideband (ACSB) signal processing systems for land based mobile radios represents an attempt to implement SSB in a manner that overcomes some of the problems inherent in conventional SSB. Essentially, a practical ACSB system operates in the following manner. First, the baseband voice signal is compressed to improve the peak-to-average power ratio of the voice signal. The voice signal is then added to a pilot tone. The voice signal and pilot tone are then used to modulate a carrier signal. The signal generated by this modulation process is then filtered to select one of the sidebands that result therefrom and suppress the carrier. The resulting SSB signal is then amplified and transmitted to a receiver. The receiver unit uses the pilot tone, to tune itself precisely to the transmitter and thus recover the voice signal.

In order to improve the ability of the ASCB transmitter to meet frequency bandwidth emission limits, the amplitude of the pilot signal is varied in the transmitter in proportion to the strength of the voice signal. The receiver then uses the strength of the pilot signal to restore natural voice amplitude variations to the voice signal. This correction process also compensates for signal strength variations caused by fading.

A variation on the ACSB system described above is referred to as transparent-tone-in-band (TTIB). In a TTIB system, the transmitter divides the voice signal into two sections, shifts one of the sections up or down as necessary to create a notch between the two sections, and places the pilot tone within the notch. The receiver then separates the pilot tone from the two voice sections and shifts one or the other of the voice sections up or down as necessary to recombine the sections into the compressed voice signal. As in the conventional ACSB system, the receiver then uses the pilot tone to tune itself precisely to the transmitter, restore natural voice amplitude variations to the compressed voice signal, and to compensate for fading.

A TTIB system results in a broadcast signal in which the pilot tone is placed in the middle of the frequency band. The pilot tone is thus protected from adjacent channel interference and the effects of non-ideal filter characteristics at the edges of radio channel filters in the transmitter and receiver. TTIB is basically disclosed in a paper entitled IEEE Conference on Communication Equipment Systems, Apr. 20-22, 1982, pp. 121-26 by McGeehan, Batemen, and Burrows. Refinements to the TTIB system have included the ability to transmit data in place of voice and methods of maintaining the frequency, phase, and amplitude integrity of the voice signal. Such refinements are disclosed, for example, in U.S. Pat. Nos. 4,792,985 and 4,947,453 issued to McGeehan et al.

The primary problem with conventional ASCB and ASCB implemented with TTIB principles is that these systems do not easily allow simultaneous transmission of trunking control data. It was suggested in U.S. Pat. No. 4,802,191 issued to McGeehan et al. that additional data may be transmitted by time varying the voice band separation frequency. This method is inadequate, however, because it relies on the continuous presence of the voice signal to act as a carrier. Therefore, in situations where no voice signal is being transmitted, no additional data may be sent.

OBJECTS OF THE INVENTION

In view of the foregoing, it is apparent that an important object of the present invention is to provide a spectrum efficient single sideband signal processing system.

Another important, but more specific, object of the present invention is to provide a single sideband signal processing system having a favorable mix of the following factors:

a. allowing the simultaneous transmission of a plurality of information components such as a voice signal and trunking data;

b. providing acceptable peak-to-average power ratio for transmitters in the system;

c. providing a mechanism for tuning the receiver to the transmitter in the absence of a carrier signal;

d. compensating for the effects of fading on the transmitted SSB signal;

e. meeting radio frequency bandwidth emission limits;

f. operating in the 220-222 MHz range allocated by the FCC for the development of narrowband technologies; and g. efficiently using a channel composed of two 5 kHz frequency ranges.

SUMMARY OF THE INVENTION

The above and other objects are achieved by the present invention, which basically comprises: (a) a transmitter having (i) means for generating a first baseband signal comprising first, second, and pilot components, (ii) means for modulating the first baseband signal in inverse proportion to the strength of the first component of the first baseband signal, and (iii) means for generating and transmitting a first single sideband signal comprising first, second, and pilot portions corresponding to the first, second, and pilot components of the modulated first baseband signal; (b) a repeater having (i) means for receiving the first single sideband signal, (ii) means for generating a second baseband signal comprising first, second, and third components corresponding to the first, second, and third portions of the single sideband signal, (iii) means for correcting the second baseband signal based on the pilot component of the second baseband signal, (iv) means for generating a third baseband signal having first, second, and pilot portions, where the first portion of the third baseband signal corresponds to the first portion of the corrected second baseband signal, and (v) means for generating and transmitting a second single sideband signal comprising first, second, and pilot portions corresponding to the first, second, and pilot components of the third baseband signal; and (c) a receiver having (i) means for receiving the second single sideband signal, (ii) means for generating a fourth baseband signal comprising first, second, and third components corresponding to the first, second, and third portions of the second single sideband signal, and (iii) means for correcting the fourth baseband signal based on the pilot component of the fourth baseband signal.

Preferably, the first component of the first, second, third, and fourth baseband signals and the first portion of the first and second SSB signals carry voice information and the second component of the first, second, third, and fourth baseband signals and the second portion of the first and second SSB signals carry trunking data information.

It is also advantageous to provide the transmitter with means for shifting a first portion of the first component of the first baseband signal to create a notch in the first baseband signal between the first portion of the first component of the first baseband signal and a second portion of the first component of the first baseband signal, where the second component of the first baseband signal is located within this notch. In this case, the receiver further comprises: (a) means for selecting the second component of the second baseband signal, and (b) means for shifting one of a first and a second portions of the first component of second baseband signal to eliminate the notch between the first and second portions of the first component of the second baseband signal.

The repeater and receiver correcting means preferably correct the phase of the second and fourth baseband signals by multiplying the in-phase and quadrature components of the second and fourth baseband signals by the in-phase and quadrature components of the pilot component of the second and fourth baseband signal, respectively. The repeater and receiver correcting means correct the amplitude of the second and fourth baseband signals by dividing the in-phase and quadrature components of the second and fourth baseband signal by the magnitude of the pilot component of the second and fourth baseband signals, respectively.

The present invention is particularly useful when it further comprises trunking means for generating trunking data for controlling a channel over which the first and second single sideband signals are transmitted.

BRIEF DESCRIPTION OF THE DRAWING

FIG. 1 depicts a basic block diagram of a single sideband signal processing system constructed in accordance with the present invention;

FIG. 2 depicts a frequency spectrum of a SSB signal employed by the present invention;

FIG. 3 depicts a block diagram of a mobile unit of the present invention;

FIGS. 4 and 5 depict a functional block diagram showing a mobile unit of the present invention in transmit mode and receive mode, respectively;

FIGS. 6A-6C and 7A-7C depict a functional block diagram illustrating the processing performed by the digital signal processor employed by the present invention under control of a transmit DSP program and a receive DSP program, respectively; and FIG. 8 depicts a functional block diagram of the frequency tracking feature of the present invention.

DETAILED DESCRIPTION OF THE PREFERRED EMBODIMENT

Figure 6A:
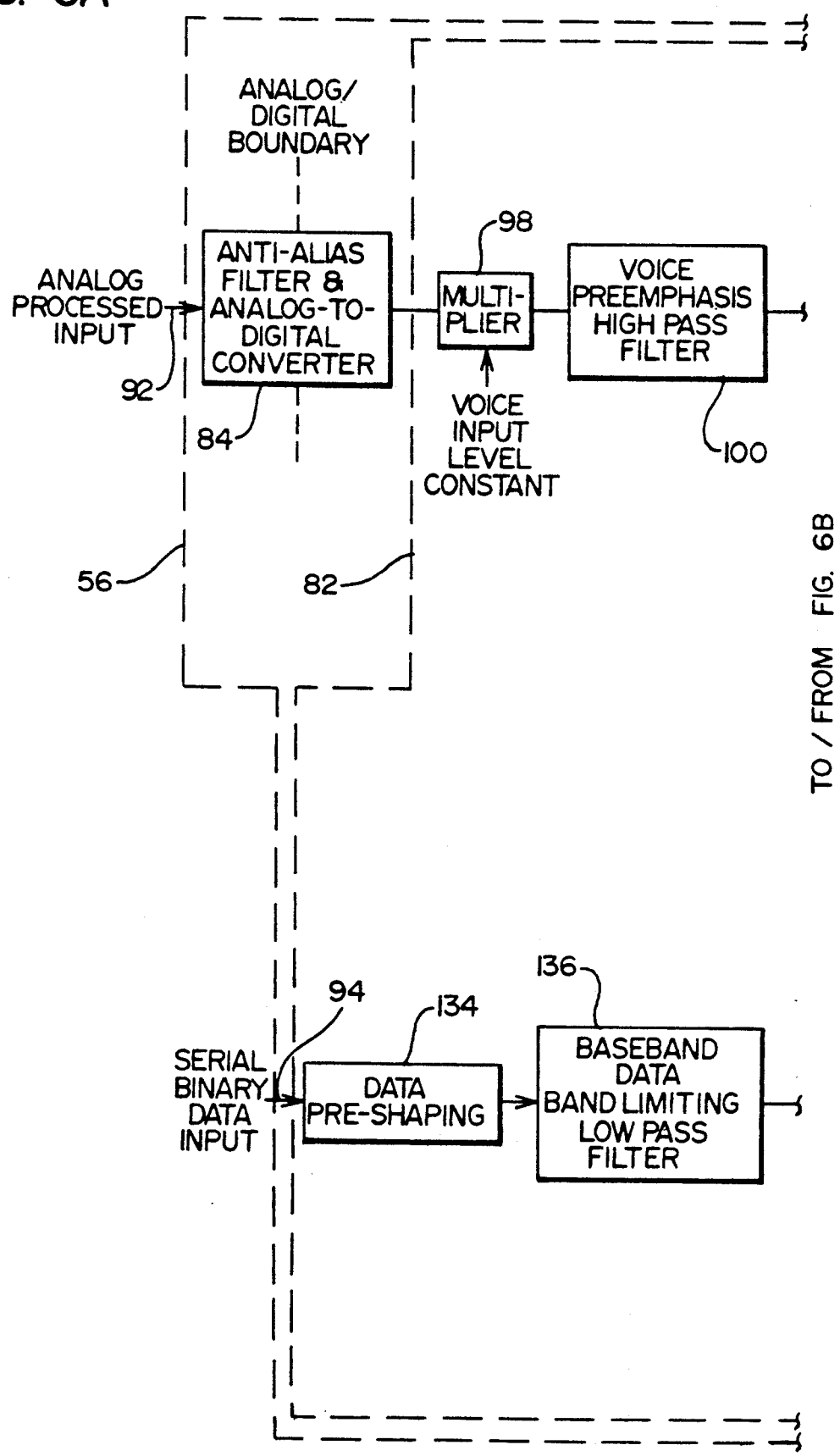

Referring now to the drawing, schematically depicted in FIG. 1 is an SSB signal processing system 10 constructed in accordance with, and embodying, the principles of the present invention. The system 10 generally comprises one or more mobile units $12_{1-n}$, a base station 14, and a trunking system controller 16. The trunking system controller 16 is preferably a system such as model number 49 sold by Zetron, Inc. and will be discussed herein only to the extent necessary for a complete understanding of the present invention.

Each mobile unit 12 comprises a half-duplex transceiver 18, a microphone 20, a speaker 22, a transmit switch 24, a selector switch 26, and an antenna 28. The base station 14 comprises one or more full-duplex repeaters $30_{1-m}$ and an antenna 32. Each base station repeater 30 comprises a duplexer 34, a receiver 36, and a transmitter 38. The base station receiver 36 and transmitter 38 are in communication with each other through a communication path 40. Additionally, the receiver 36 communicates with the trunking system controller 16 through a communication path 42, while the transmitter 38 communicates with the trunking system controller 16 through a communication path 44.

The SSB system 10 basically operates in the following manner. The base station 14 periodically transmits trunking data on the base channel $C_B$ via the repeater $30_1$. The trunking data comprises information indicating channel availability and the identification codes of sending and receiving mobile units 12. Each latent mobile unit 12 monitors the trunking data transmitted on the base channel $C_B$. Each mobile unit 12 thus knows what channel is available for broadcast and whether another mobile unit 12 is attempting to communicate therewith.

To illustrate, if the operator of mobile unit $12_1$ wishes to communicate with the operator of mobile unit $12_n$, the operator of mobile unit $12_1$ selects a setting on the selector switch $26_1$ that selects an ID code uniquely identifying the mobile unit $12_n$. Trunking control data is then generated based on the ID code of mobile unit $12_n$. Because the mobile unit $12_1$ has been monitoring the trunking data sent on the base channel $C_B$, this unit $12_1$ knows whether the base channel $C_B$ is occupied and thus the signal must be broadcast on an alternate available channel $C_A$. Assuming for purposes of this discussion that the base channel $C_B$ is occupied, when the operator presses the transmit switch $24_1$, the transceiver $18_1$, operating in a first, transmit, mode, transmits a first SSB signal comprising at least a voice portion and trunking data containing the ID code of mobile unit $12_n$ over the available channel $C_A$.

The base station antenna 32 receives this SSB signal on the channel $C_A$, and the duplexer $34_m$ of the repeater $30_m$ passes this signal to the base station receiver $36_m$. The receiver $36_m$ then separates the voice portion from the trunking data. The voice portion is passed to the base station transmitter $38_m$ through the communication path $42_m$, while the trunking data is passed to the trunking system controller 16 through the communication path $44_m$. The trunking system controller 16 analyzes the trunking data transmitted by the mobile unit $12_1$ and determines the destination, in this case mobile unit $12_n$, of the voice portion of the received SSB signal transmitted by the mobile unit $12_1$. The trunking system sends new trunking data over the base channel $C_B$ that notifies the mobile unit $12_n$ to move to the channel $C_A$. The trunking system controller 16 then controls the base station transmitter $40_m$ to retransmit the voice portion, along with any new trunking data directed to the mobile units $12_1$ and/or $12_n$, over the available channel $C_A$ as a second SSB signal.

The receiving mobile unit $18_n$ receives this second SSB signal and separates out the voice portion and the trunking data portion therefrom. The voice portion may be amplified and perceived by the user of the unit $18_n$, while the trunking data is monitored for further instructions from the trunking system controller 16.

An important aspect of the present invention is the composition of the SSB signal sent between the mobile units 12 through the base station 14. A frequency spectrum of a typical such SSB signal is depicted at 46 in FIG. 2. Analysis of the spectrum in FIG. 2 indicates that this signal 46 comprises four distinct portions (a) a first voice portion 48; (d) a data portion 50; (c) a second voice portion 52; and (c) a pilot tone portion 54.

The first and second voice portions 48 and 52 together comprise the above-described voice portion of the SSB signal 46 and contain all the information necessary to reconstruct an audio output signal at the speaker 22 of the receiving mobile unit $12_n$ corresponding to a voice input signal generated by the microphone 20 of the transmitting transceiver $12_1$. These first and second voice portions 48 and 52 are compressed in the transmitting mobile unit's transceiver 18 to provide a desirable peak-to average power ratio and then expanded in the receiving mobile unit's transceiver 18 to restore much of the natural voice amplitude variations to the reconstructed voice signal.

The data portion 50 of this signal 46 contains a frequency shift key (FSK) encoded version of the trunking data generated by the mobile units 12 and the trunking system controller 16.

The pilot tone portion 54: (a) provides a precise frequency reference for the mobile unit transceivers 12 and base station receiver 36; (b) contains amplitude modulation information for restoring natural voice amplitude variations to the voice portion of the SSB signal; and (c) is used by a transceiver 18 in its receive mode or the base station receiver 36 to reduce the effects of fading.

It should be noted that, in the preferred embodiment, the first and second SSB signals just-discussed each occupies less than 4 kHz of the frequency spectrum. Each channel in the 220-222 Mhz band comprises two 5 kHz wide portions totalling 10 kHz for each channel. The transmitting mobile unit 18 thus transmits the first SSB signal in one of these 5 kHz portions and the transmitter 38 of the base station 14 transmits the second SSB signal on the other of these 5 kHz portions. In the particular system 10 discussed above, the two 5 kHz portions of each channel are separated by 1 MHz.

In the above-described SSB system 10, the transceivers 18 operate in the same basic manner as the receiver 36 and transmitter 38. The transceivers 18 will therefore be discussed in detail below, with the receiver 36 and transmitter 38 being discussed herein only to the extent that they differ from the transceivers 18.

A mobile unit 12 is depicted in FIG. 3 showing the transceiver 18 thereof in greater detail Each transceiver 18 basically comprises: (a) a baseband signal processing portion 56; (b) a host microprocessor 58; (c) a voice input stage 60; (d) an audio output stage 62; (e) an RF input stage 64; (g) an RF output stage 66. The baseband signal processing portion 56 communicates with the RF input stage 64 through a frequency tracking communication path 68, the purpose of which will be described in greater detail below.

Of the foregoing components, the host microprocessor 58, voice input stage 60, audio output stage 62, and RF output stage 66 are basically conventional and will be discussed below only to the extent necessary for a complete understanding of the present invention.

The host microprocessor 58 can be any general purpose microprocessor and has ROM, RAM $58a$, and EEPROM $58b$ (FIG. 8) associated therewith for non-volatile and volatile storage of program instructions and data. The host microprocessor 58 receives signals from peripheral components such as the transmit switch 24 and the select switch 26 and generates trunking data and control signals for controlling the various components of the transceiver 18, as will be described in greater detail below.

The voice input stage 60 comprises amplification and compression circuits 70 that amplify an analog voice signal generated by the microphone 20 and compress this voice signal to reduce the peak-to-average power ratio thereof. The processed analog voice signal is then sent to the baseband signal processing portion 56.

The audio output stage 62 comprises amplification and expanding circuits 72 that expand and amplify an analog audio signal generated by the baseband signal processing portion 56. The amplified/expanded analog audio signal generated by the output stage 62 is sent to the speaker 22 where it is converted into sound energy that may be perceived by the user of the mobile unit 12.

The RF input stage 64 comprises an RF amplifier 74 and a demodulator 76 configured to amplify a received SSB signal detected by the antenna 22 and down convert this received SSB signal in frequency to generate a baseband composite signal that is sent to the baseband signal processing portion 56. The RF input stage 64 further comprises frequency tracking circuitry that will be discussed in detail below with reference to FIG. 8.

The RF output stage 66 comprises a modulator 78 which modulates a carrier signal with a composite output signal generated by the baseband signal processing portion 56. This modulated signal is then amplified by an RF amplifier 80 to generate an SSB signal that is transmitted through the antenna 28. (While the antenna 28 is shown in two places in FIG. 3 for reasons of clarity, it should be understood that in most cases, and specifically in the mobile unit 12, only one such antenna is used.)

The baseband signal processing portion 56 of each transceiver 18 comprises a digital signal processor (DSP) 82, an analog-to-digital (A/D) converter 84, a digital-to-analog (D/A) converter 86, a first transmit/receive switch 88, and a second transmit/receive switch 90. The DSP 82 may be any general purpose DSP, but, in the system 10, is an integrated circuit manufactured by Analog Devices and sold on the market as Model Number ADSP 2105. ROM and RAM associated with the DSP 82 provide non-volatile and volatile storage for program instructions and data processed thereby.

Depending upon the state of the first transmit/receive switch 88, the A/D converter 84 converts either the processed analog voice signal generated by the voice input stage 60 or the baseband composite input signal generated by the RF input stage 64 into a digital signal that may be processed by the DSP 82. The D/A converter 86, on the other hand, converts a digital signal generated by the DSP into either the analog audio signal that is sent to the audio output stage 62 or the baseband composite output signal that is sent to the RF output stage 66 in accordance with the state of the second transmit receive switch 68.

The switches 64 and 66 are controlled by the host microprocessor 58 to reconfigure the transceiver 18 between a transmit mode and a receive mode. More particularly, when the transmit switch 24 is pressed, the host microprocessor 58 generates a signal that controls the first transmit/receive switch 88 to allow the processed analog voice signal generated by the voice input stage 60 to reach the input terminal of the A/D converter 84 while preventing the baseband composite input signal generated by the RF input stage from reaching the input terminal of the A/D converter 84. At the same time, the microprocessor 58 generates a signal that controls the second transmit/receive switch 90 to connect the output of the D/A converter 86 of the baseband signal processing portion 56 to the RF output stage 66. The basic system that results when the transceiver 18 is in its transmit mode is depicted in a somewhat simplified in FIG. 4.

When the transmit switch 24 is not pressed, the transceiver 18 is in its receive mode. In the receive mode, the microprocessor 58 generates a signal that controls the first transmit/receive switch 88 to allow the processed analog voice signal generated by the voice input stage 60 to reach the input terminal of the A/D converter 84. At the same time, the microprocessor 58 generates a signal that controls the second transmit/receive switch 90 to connect the output of the D/A converter 86 of the baseband signal processing portion 56 to the RF output stage 66. The basic system that results when the transceiver 18 is in its receive mode is depicted in a somewhat simplified form in FIG. 5.

The system configurations depicted in FIGS. 4 and 5 will now be discussed in further detail. When in the transmit mode depicted in FIG. 4, the transceiver 18 operates basically in the following manner. A user of the mobile unit 12 first chooses a setting on the select switch 26 and presses the transmit switch 24. The host microprocessor generates trunking data based on the setting of the select switch 26 and directs the DSP 82, which normally operates under control of a receive DSP program, to operate under the control of a transmit DSP program.

The user then speaks into the microphone 20, which generates the analog voice signal corresponding to the users speech. This analog voice signal is next amplified and compressed in the voice input stage 60. The amplified and compressed analog voice signal is then converted to a corresponding digital voice signal by the A/D converter 84. The digital voice signal is then sent to the DSP 82.

The DSP 82, acting under control of the transmit DSP program, generates a digital composite output signal by: (a) separating the voice signal into two separated voice components; (b) further compressing these voice components; (c) encoding trunking data received from the host microprocessor 58 as an FSK signal; (d) inserting this FSK signal into the gap between the two voice components; and (e) placing a modulated pilot tone above (in frequency) the uppermost of the two voice components. The pilot tone is modulated in inverse proportion to the compression applied within the DSP 82 to the voice components. The D/A converter 86 then converts the digital composite output signal into the composite output signal.

The composite output signal is then sent to the RF output stage 66. The RF modulator 66 modulates a carrier signal with the composite output signal to obtain the first SSB signal shown at 46 in FIG. 2, which is then amplified by the RF amplifier 68 and transmitted through the antenna 28. It should be noted that the modulator 66 and amplifier 68 include appropriate, known filters so that the resulting SSB signal is, as its name implies, a single side band signal.

When in its receive mode depicted in FIG. 5, the transceiver 18 basically operates in the following manner. The antenna 28 receives an SSB signal like that shown at 46 in FIG. 2 either directly from another mobile unit 12 or indirectly through the base station 14 configured in its repeater mode. The received SSB signal is amplified by the RF amp 64. The RF demodulator 66 then generates a baseband composite signal by demodulating the received SSB signal. Again, the components of the RF input stage 64 include appropriate filters to pick off only one sideband of the demodulated signal and thus ensure that the baseband composite signal is a single sideband signal.

The baseband composite signal is then sent to the A/D converter 84 where it is converted into a digital baseband composite signal and sent to the DSP 82. The DSP 82, acting under control of the receive DSP program, performs the following functions: (a) uses the pilot tone to correct phase and amplitude distortion in the remaining portions of the baseband composite signal; (b) generates a digital audio signal by recombining the two separate voice signal components of the corrected digital baseband composite signal; (c) and filters out and recovers the trunking data from the FSK signal. The D/A converter 86 then converts the digital audio signal into the analog audio signal signal that is amplified by the amplifier circuit 62 and converted to sound energy by the speaker 22. The trunking data obtained by decoding the FSK signal is sent to the host microprocessor 58. The microprocessor 58 determines whether to pass the audio signal to the speaker 28 based on the trunking data.

Figure 6B:
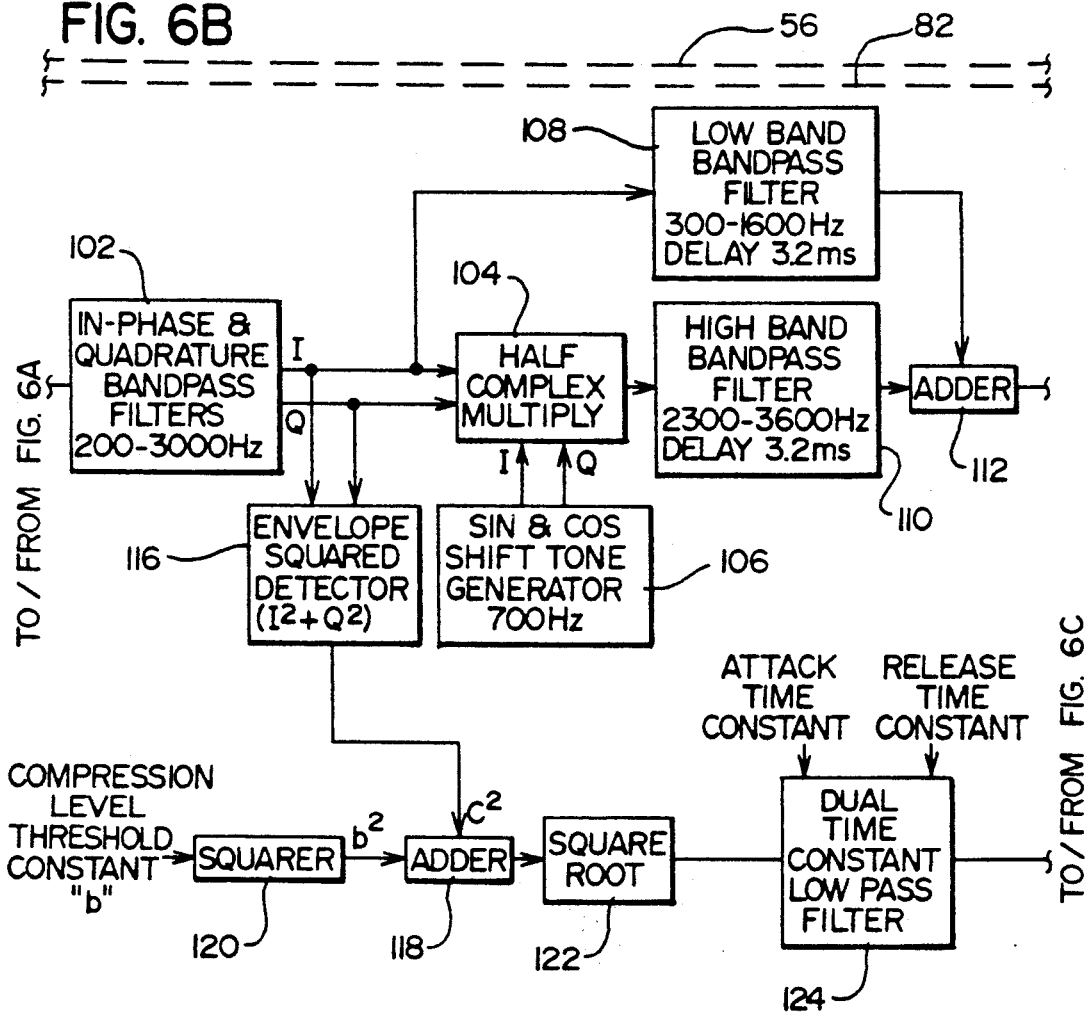
Figure 6C:
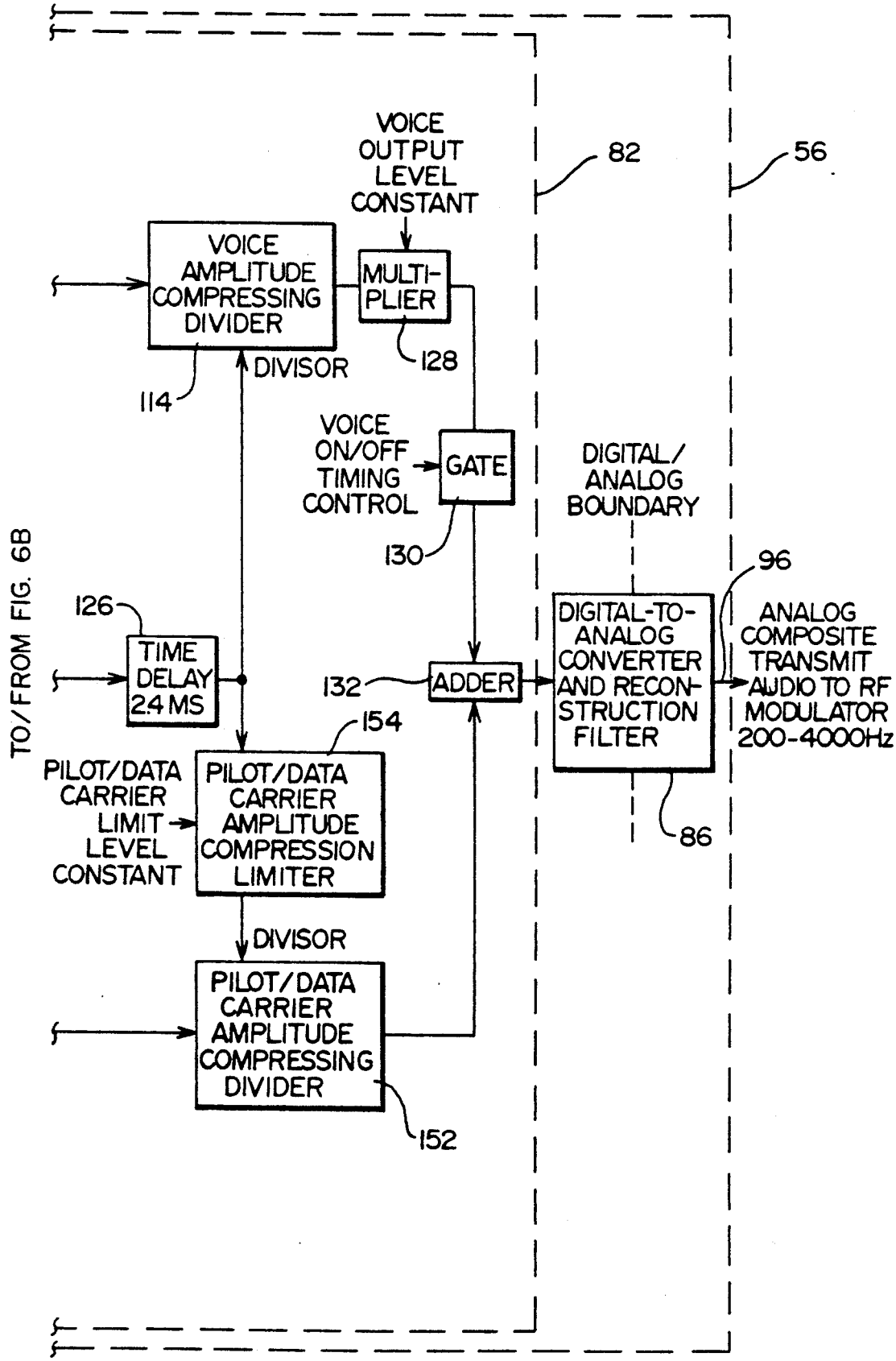
Figure 7C:
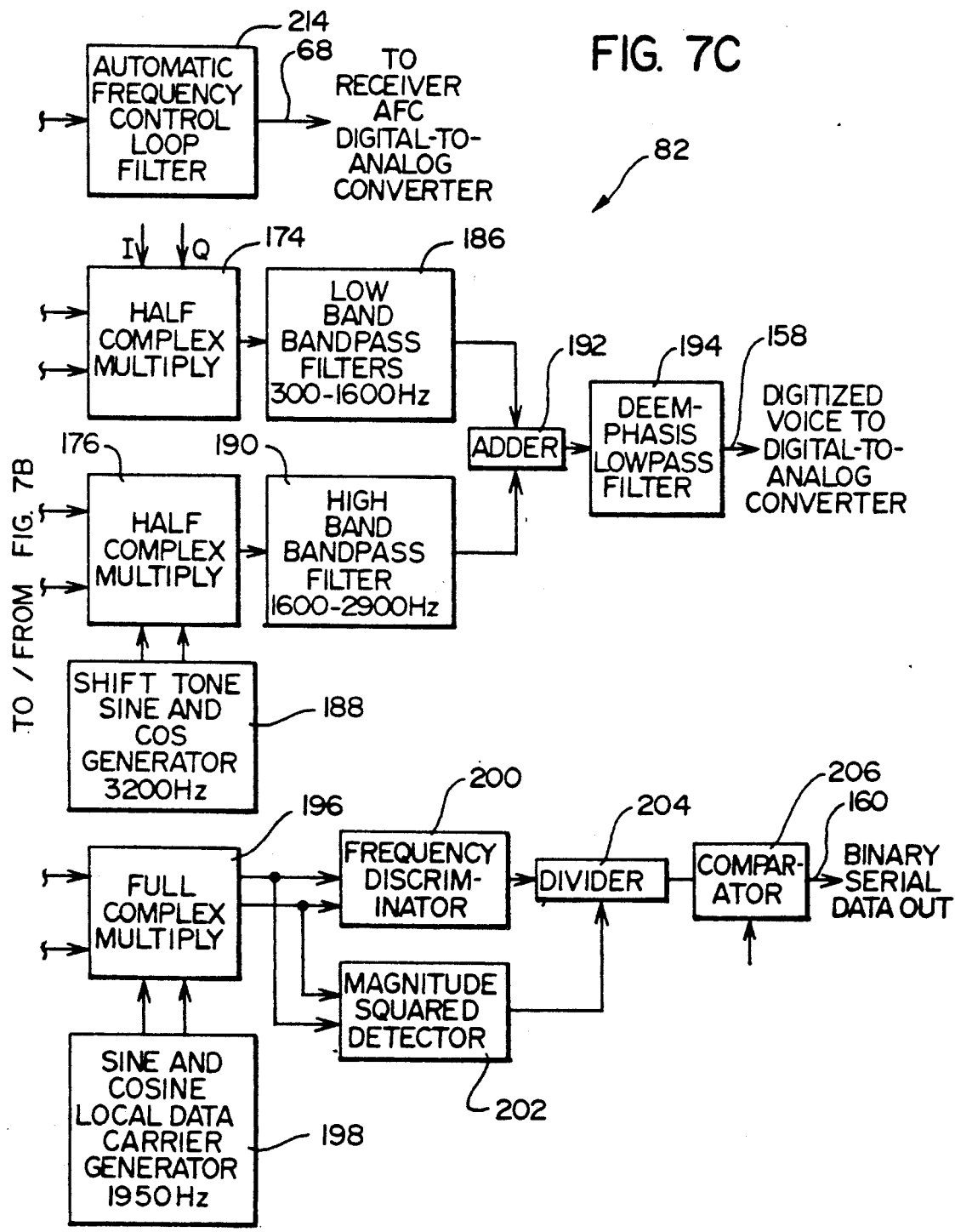

The processing performed by the DSP 82 under control of the transmit DSP program and the receive DSP program is shown in more detail in FIGS. 6 and 7, respectively. It should be clear that the baseband processing performed by the baseband processing portion 56 may be implemented either in software as described herein or with discrete components. In the following discussion, this baseband processing will be described in terms of discrete components with the understanding that these components are implemented in software in the preferred embodiment.

Referring now to FIG. 6, the operation of the baseband processing portion 56 when the transceiver 18 is in transmit mode will be explained in further detail. Initially, it should be noted that the processing portion 56 processes two input signals to generate one output signal. More particularly, the processed analog voice signal and a serial binary data stream representing the trunking data enter the processing portion 56 through input points 92 and 94, respectively. The composite output signal exits the processing portion 56 through an output point 96.

Turning first to the analog voice signal, this signal first enters the A/D converter 84 where it is filtered to avoid creating aliases and converted to digital form. A multiplier 98 multiplies the digital voice signal by a preset constant. The digital voice signal then is filtered by a single pole high pass filter 100. This processing, referred to as preemphasis, provides signal processing gain that evens out frequency gain distribution of the voice signal.

The digital voice signal is then passed through in-phase and quadrature bandpass filters 102 to separate the digital voice signal into in-phase and quadrature components I and Q, respectively. The filters 102 pass only portions of the signal in the frequency range of 200–3000 Hz. The reason the digital voice signal is separated into these components I and Q is to allow the subsequent shifting of one portion of the digital voice signal up in frequency without the creation of unwanted sidebands.

Specifically, a half-complex multiplier 104 multiplies these in-phase and quadrature components I and Q in a real and imaginary multiplication process by a 700 Hz sine and cosine shift tone created by a shift tone generator 106. This shifts the entire digital voice signal up 700 Hz so that it now is in the range of 900–3700 Hz. Because the digital voice signal has been shifted in a full real and imaginary fashion, the unwanted sideband cancels out, leaving only the desired signal shifted up in frequency by 700 Hz.

At the same time, the in-phase component I of the unshifted digital voice signal is passed through a low bandpass filter 108 to pass only the portion thereof in the frequency range of 300–1600 Hz. The in-phase component I of the shifted digital voice signal is passed through a high bandpass filter 110 to select only that portion thereof in the range of 2300–3600 Hz.

An adder 112 then adds the outputs of these filters 108 and 110 to generate a notched signal comprising two distinct upper and lower components with a gap of 700 Hz therebetween. In the preferred embodiment, this gap extends from approximately 1600 Hz to 2300 Hz. As will become clear from the following discussion, the lower of these components corresponds to the first voice portion 52 of the SSB signal 46 depicted in FIG. 2 and the upper of these components corresponds to the second voice component 42 of the SSB signal 46.

A voice amplitude compression divider 114 then divides the amplitude of the notched signal by a compression signal to reduce the peak-to-average power ratio of these components. Accordingly, the transceiver 18 twice compresses the voice signal. The analog voice signal is compressed in known fashion by the amplification and compression circuits in the voice input stage 60. Further, the digital voice signal having a portion thereof shifted to created a notch therein is compressed by the divider 114.

The compression signal used to compress the notched signal is created in the following manner. Referring back to the in-phase and quadrature bandpass filters 102, the outputs I and Q of these filters 102 are also sent to envelope squared detector 116. The detector 116 generates an output signal $c^2$ corresponding to the sum of the in-phase and quadrature components squared $(I^2+Q^2)$.

The output signal $c^2$ of the detector 116 is then added by an adder 118 to an output signal $b^2$ generated by a squarer 120. For reasons that will become clear from the following discussion, the input b to the squarer 120 corresponds to a level below which the compression signal should not fall.

An element 122 takes the square root of the signal generated at the output of the adder 118 to obtain the RMS value of the amplitude this output signal.

The output of the element 122, which basically forms the compression signal, is filtered by a dual time constant low pass filter 124 to filter out envelope variation frequencies of the compression signal above approximately 100 Hz.

The compression signal is then delayed by a component 126 for approximately 2.4 ms to compensate for the longer propagation delay in the signal paths extending through the filters 108 and 110.

As discussed briefly above, the compression signal is used as the denominator in the calculations performed by the voice amplitude compressing divider 114. As would be obvious to one of ordinary skill in the art, allowing the compression signal to fall to zero would create an unstable condition in which the output of the divider would attempt to go to infinity. Accordingly, should the voice signal and thus the envelope squared detector output $c^2$ go to zero, the input b to the squarer 120, which is constant, prevents the compression signal from dropping to zero and thus prevents divider 114 from attempting to divide by zero.

The compressed notched signal generated by the voice amplitude compressing divider 114 is multiplied by a constant in a multiplier 128, passed through a voice on/off timing control gate 130, and applied to an input of an adder 132.

The processing of the serial binary data stream entering the DSP 82 through the input point 94 will now be discussed. The binary data stream is conventional and comprises a series of square pulses. Because square waves are rich in harmonic energy, the rising and falling edges of the square pulses in the binary data stream are initially rounded off by a data pre-shaping component 134 and a low pass filter 136.

The serial data stream is then applied to a frequency modulated sine wave data carrier generator 138 the output of which is an FSK signal corresponding to the data encoded in the serial data stream. The FSK signal is centered at 1950 Hz, which it may be recalled is in the center of the notch between 1600 and 2300 created in the notched signal.

The FSK signal is next filtered by a data carrier bandpass filter 140 to remove any spurious signals generated in the modulation process executed by the data carrier generator 138. The filtered FSK is then multiplied in a multiplier 142 by a constant and gated in a data carrier on/off timing control gate 144. The resulting signal is sent to an input of an adder 146.

The other input to the adder 146 is a 3900 Hz sine wave pilot tone signal generated by a sine pilot tone generator 148. It will be recalled that the upper end of the notched signal ends at approximately 3600 Hz. The pilot tone signal is thus centered 300 Hz above the upper end of the notched voice signal.

The adder 146 generates a pilot/data carrier signal comprising the FSK signal centered at 1950 Hz and the pilot tone centered at 3900 Hz.

The amplitude of the pilot/data carrier signal is compressed by a pilot/data carrier amplitude compressing divider 152. The divisor of this divider 152 is essentially the compression signal used by the voice amplitude compressing divider 114, but is limited to a certain maximum value determined by a constant input to a pilot/-data carrier amplitude compression limiter 154. Within given limits, the amplitude of the pilot/data carrier signal is thus compressed by basically the same amount as the notched voice signal discussed above.

The compressed pilot/data carrier signal is then added to the notched voice signal by the adder 132 to generate a digital composite output signal. The digital composite output signal is contained within approximately 4 kHz and comprises, in the following order, the lower component of the notched voice signal (300-1600 Hz), the FSK data carrier signal (centered at 1950 Hz), the upper component of the notched voice signal (2300-3600 Hz), and the pilot tone signal (centered at 3900 Hz).

From the foregoing, it is apparent that the FSK data carrier signal is approximately in the middle of a 4 Khz frequency range occupied by the composite output signal. This is desirable because placing the FSK data carrier signal in the middle: (a) keeps this signal away from relatively severe phase shifts inherent at the upper and lower ends of the filters used in the RF input and output stages 64 and 66; and (b) separates this signal from the pilot signal to prevent false locking by the frequency tracking circuits 226. Because the human ear is not very sensitive to phase shifts, phase shifts in the notched voice signal are not noticed by the user.

The SSB signal depicted in FIG. 2 is essentially the same as the just described composite output signal but is shifted up in frequency by the RF modulator 78 of the RF output stage 66. More particularly, the lower component of the notched signal corresponds to the first voice portion 48, the FSK data carrier signal corresponds to the data portion 50, the upper component of the notched signal corresponds to the second voice portion 52, and the pilot tone signal corresponds to the pilot tone portion 54.

When under control of the DSP receive program, the DSP 82 essentially reverses the processing just described with respect to the DSP transmit program. Referring to FIG. 7, it can be seen that the digital composite input signal enters the DSP 82 at an entry point 156. The digital audio signal exits the DSP 82 at an exit point 158 and the binary serial data stream in which trunking data is encoded exits the DSP 82 at an exit point 160.

Initially, it should be noted that the composite input signal received at a receiving mobile unit 12 will fairly accurately represent the composite output signal generated in the transmitting mobile unit 12. However, due to non-linearities in various components of the RF input and output stages 64 and 66 and the effects of multipath fading and other interference on the SSB signal 46, the composite input signal will normally be distorted in both phase and magnitude. The digital composite input signal reflects these distortions.

The digital composite input signal is initially filtered by pilot carrier in-phase and quadrature bandpass filters 162 and wide bandpass in-phase and quadrature bandpass filters 164. The filters 162 pass only signals in the range of 3800-4000 Hz and thus select out the in-phase and quadrature components of the pilot signal of the composite input signal. The filters 164 pass signals in the range of 300-3600 Hz and thus select the in-phase and quadrature components of the remaining components, specifically the notched voice signal and the FSK data carrier signal, of the composite input signal.

The in-phase and quadrature components of the notched voice and FSK data carrier signals are then multiplied by the in-phase and quadrature components of the pilot signal in a full complex multiplier 166. Because phase modulation effects of multipath fading of the SSB signal 46 affect the pilot signal, notched voice signal, and FSK data carrier signal in the same manner, multiplying the notched and data carrier signals by the pilot signal as just described substantially reduces the phase modulation introduced by multipath fading. In this step, the amplitude variations of the resulting signal are squared.

At the same time, a magnitude squared detector 168 detects the magnitude squared of the pilot signal. Two dividers 170 and 172 then divide the in-phase and quadrature components, respectively, of the phase-adjusted notched voice and FSK data carrier signals by the magnitude squared of the pilot signal. Again, because the amplitude modulation on the notched voice and FSK data carrier signals, whether caused by compression in the transmitting mobile unit or by multipath fading, is the same as that on the pilot signal, the above-described dividers 170 and 172 effectively expand the notched voice and FSK data carrier signals to eliminate the compression applied thereto in the transmitting unit and to compensate for the effects of amplitude modulation caused by multipath fading.

It should be noted that the outputs of the multiplier 166 and the detector 168 both have squared amplitudes. The resulting signals generated by the dividers 170 and 172 thus are of appropriate magnitudes but are adjusted to eliminate modulation and fading effects.

Two other aspects of the full complex multiplication process performed in the multiplier 166 are of note. First, this process cancels out one of the two sidebands ordinarily created by multiplying two signals together. Second, in the specific implementation illustrated in FIG. 7, the selected sideband is arranged below the frequency of the pilot tone and is essentially inverted in frequency; that is, portions of the signal that were at the upper end of the frequency spectrum prior to the multiplier 166 are at the lower end of the frequency spectrum after the multiplier 166, and vice versa. The information contained in the notched voice and FSK data carrier signals is still present, but the inverted signal must be reinverted at some point to allow the voice signal to be decoded properly.

After the dividers 170 and 172, an adjusted signal is present that contains the notched voice and the FSK data carrier signals, has been adjusted to reduce phase and amplitude distortions, and is inverted in frequency. The remaining circuitry must reinvert, select out, and recombine the upper and lower components of the notched voice signal and select out and decode the trunking data represented in the FSK data carrier signal.

To that end, the adjusted signal is sent to a first half complex multiplier 174, a second half complex multiplier 176, a first data carrier bandpass filter 178, and a second data carrier bandpass filter 180.

By multiplying the adjusted signal by a 3900 Hz pilot tone internally generated by a sine and cosine local pilot carrier generator 182, the multiplier 174 revolves the adjusted signal around the frequency of the pilot tone and reinverts the adjusted signal so that it is now correctly oriented in frequency. The lower component of the notched voice signal is then selected by a low band bandpass filter 186. The voice lower component is now correctly oriented and placed in the frequency spectrum. The locally generated pilot tone is used instead of the received pilot carrier signal to avoid reintroducing the phase distortion present on the received pilot carrier signal.

The multiplier 176 multiplies the adjusted signal by a shift tone signal generated by a shift tone sine and cosine generator 188. The shift tone signal is centered at 3200 Hz and is thus 700 Hz lower than the pilot tone signal. Accordingly, not only is the adjusted signal reinverted by the multiplier 176, it is shifted down 700 Hz relative to the pilot tone signal. The upper voice component in this reinverted and frequency shifted adjusted signal is now correctly oriented and placed in the frequency spectrum. The upper voice component of the notched voice signal is then selected out by a high bandpass filter 190 and added to the lower voice component by an adder 192.

The output of the adder 192, which is filtered by a deemphasis lowpass filter 194, is the digital audio signal. The digital audio signal is sent to the D/A converter 86 where it is converted into the analog audio signal as described in detail above.

The first and second data carrier bandpass filters 178 and 180 pass the 1800–2100 Hz portion of the quadrature and in-phase components of the adjusted signal, thereby yielding only the quadrature and in-phase components of the FSK data carrier signal at their outputs, respectively. The resulting FSK data carrier signal is then multiplied in a full complex multiplier 196 by a local data carrier signal generated by a sine and cosine local data carrier generator 198. The local data carrier signal is centered at 1950 Hz, the same center as the FSK data carrier signal. Accordingly, the output of the multiplier 196 is a signal that goes above and below zero hertz in a manner that corresponds to the binary serial data input to the DSP 82 of the transmitting mobile unit 12.

It should be noted that the full complex multiplication process performed by the multiplier 196 does not reinvert the FSK data carrier signal; however, reinversion of this signal is a relatively simple process that can be more easily taken care elsewhere in the transceiver 18, such as in the host microprocessor 58.

A frequency discriminator 200 generates an output voltage signal that goes above and below zero volts as the signal input to this discriminator 200 goes above and below zero hertz. (The above and below zero hertz language employed herein conforms to the accepted convention followed by those skilled in the art.)

A magnitude squared detector 202 and divider 204 effect feedforward gain control of the output of the frequency discriminator 200. The reason this feedforward gain control is desirable is that the filters 178 and 180 are non-linear and exhibit a rounded frequency response curve. The detector 202 and the divider 204 compensate to some degree for this non-linearity by increasing system gain when the signal goes down the skirts of the response curves of the filters 178 and 180. Therefore, the detector 202 and divider 204 normalize this output voltage waveform.

A comparator 206 generates a binary serial data stream from the output of the divider 204. This binary data stream contains the trunking data generated at the transmitting mobile unit or by the trunking system controller 16. The host processor 58 analyzes this binary data stream as generally discussed above.

In addition to generating the digital audio signal and binary data stream as described above, the DSP 82 operating in its receive mode generates frequency tracking information that leaves the DSP 82 through the frequency tracking communication path 68.

More particularly, the above-introduced local pilot signal generated by the local pilot carrier generator 184 is multiplied by the received pilot signal obtained from the output of the bandpass filters 162 in a full complex multiplier 208. A frequency discriminator 210 then generates an output voltage signal representative of the change in frequency of the product of the local pilot signal and the received pilot signal. The output voltage of the discriminator 210 is then divided in a divider 212 by the magnitude squared of the pilot signal to obtain a frequency error signal indicative of the difference in frequency between the local pilot signal and the received pilot signal. The frequency error signal is filtered by an automatic frequency control loop filter 214 and sent to the RF input stage 64 through the communication path 68.

Referring now to FIG. 8, the RF input stage 64 is depicted in more detail As shown in FIG. 8, the RF input stage 64 comprises: (a) an RF filter 216; (b) an RF mixer 218, (c) IF filter and amplifier circuits 220; (d) an audio product detector 222; (e) an oscillator circuits 224; and (f) frequency tracking circuits 226.

The filter 216, mixer 218, circuits 220, and detector 222 are conventional and essentially mix the SSB signal with signals generated by the oscillator circuits 224 to obtain the baseband composite input signal.

The oscillator circuits 224 comprise a voltage controlled temperature compensated crystal oscillator (VCTCXO) 228 and an RF synthesizer 230. The frequency tracking circuits 226 comprise a D/A converter 232, and A/D converter 234, and an adder 236. The host processor 58 controls the RF synthesizer 230 to generate an RF signal that allows the RF signal received by the antenna 28 to mixed down to the IF range. Additionally, the host microprocessor 58 and the frequency tracking circuits 224 generate a tuning voltage that so controls the VCTCXO that the frequency of the received pilot signal closely matches that of the locally generated pilot signal.

More particularly, the microprocessor 58 generates a digital control signal that is converted into analog form by the D/A converter 232. An adder 236 adds the analog control signal to the frequency error signal generated by the DSP 82 operating under control of the DSP receive program. The output of the adder 236 is the above-mentioned tuning voltage that controls the VCTCXO 228. Accordingly, if the output of the loop filter 214 is non-zero, the VCTCXO tuning voltage is adjusted, thereby adjusting the output of the VCTCXO 228 so that this output closely matches the frequency-standard set by the element 238 in the base station 14.

More particularly, at the factory, a signal of known frequency is introduced into the antenna 28. Any error in the oscillator circuits 224 will result in a nonzero output of the loop filter 214. An initial value for the digital control signal generated by the host microprocessor 58 is chosen to be as close as possible to the middle of the range of values that can be generated by the microprocessor 58. The VCTCXO is then adjusted using a tuning element 240 so that the output of the loop filter 214 is zero. The initial value is then stored in a memory locations CV_ONE and CV_TWO in the EEPROM 58b. Thereafter, the digital control value in the memory location CV_TWO is used upon start-up.

At a given point during radio operation, such as upon receipt of a base station turn-off tone following each repeater transmission, the microprocessor 58 samples the tuning voltage through the A/D converter 234 and stores this value in a memory location FINE_FREQ in the RAM 58a. The values in memory locations FINE_FREQ and CV_TWO are then compared and, if the difference therebetween is greater than a preset value, the value in memory location CV_TWO is replaced with the value in the memory location FINE_FREQ. Accordingly, the next time the radio is powered up, the updated value in memory location CV_TWO is used to control the VCTCXO 228. Additionally, upon power up the values in memory locations CV_ONE and CV_TWO are compared. If the difference therebetween is different from a second preset value, a service request is signalled by the radio.

When the transceiver 18 is in its transmit mode, the value in memory location CV_TWO is used to control the VCTCXO 228. Because the value in CV_TWO has been set to match the output of the VCTXCO 228 with the output of the frequency standard 236 during the receive mode, the frequency of the SSB signal generated by the mobile unit 12 is highly accurate, thereby improving the ability of the base station 14 to acquire the SSB signal generated by the unit 12.

Referring now more particularly to the receiver 36 of the base station 30, this receiver 36 operates in the same basic manner as the DSP 82 under control of the receive DSP program. The binary data stream input to the receiver 36 is sent from the trunking system controller 16 through the communication path 42. Similarly, the transmitter 38 of the base station 30 operates in generally the same manner as the DSP 82 under control of the transmit DSP program. However, the serial binary data stream generated by the transmitter 38 carries the trunking data that is sent to the trunking system controller 16 via the communication path 44.

The SSB system 10 of the present invention utilizes the frequency spectrum in an extremely efficient manner. Specifically, this system 10 operates effectively in 200 channels composed of two 5 kHz frequency ranges in the 220–220 MHz range set aside by the FCC for the promotion and use of new narrowband technologies, while still meeting FCC radio frequency bandwidth emission limits. Additionally, the SSB system 10 allows the simultaneous communication of both a voice signal and trunking data in a manner that allows the implementation of an efficient trunking system. The system 10 achieves these goals while still providing a high quality voice signal to be recreated at the receiving mobile unit.

From the foregoing, it should be clear that the present invention may be embodied in forms other than that disclosed above without departing from the spirit or essential characteristics of the present invention. The above-described embodiment is therefore to be considered in all respects illustrative and not restrictive, the scope of the invention being indicated by the appended claims rather than the foregoing description. All changes that come within the meaning and scope of the claims are intended to be embraced therein.

I claim:

1. A single sideband radio system comprising:
   a. a transmitter having
      i. means for generating a first baseband signal comprising first, second, and pilot components,
      ii. means for modulating the first baseband signal in inverse proportion to the strength of the first component of the first baseband signal, and
      iii. means for generating and transmitting a single sideband signal comprising first, second, and pilot portions corresponding to the first, second, and pilot components of the modulated first baseband signal; and
   b. a receiver having
      i. means for receiving the single sideband signal,
      ii. means for generating a second baseband signal comprising first, second, and third components corresponding to the first, second, and third portions of the single sideband signal, and
      ii. means for correcting the second baseband signal based on the pilot component of the second baseband signal.

2. A system as recited in claim 1, in which the correcting means corrects the phase of the second baseband signal by a multiplication process.

3. A system as recited in claim 2, in which the correcting means corrects the amplitude of the second baseband signal by dividing the second baseband signal by the magnitude of the pilot component of the second baseband signal.

4. A system as recited in claim 1, in which the correcting means corrects the amplitude of the second baseband signal by dividing second baseband signal by the magnitude of the pilot component of the second baseband signal.

5. A system as recited in claim 1, in which:
   a. the transmitter further comprises means for shifting a first portion of the first component of the first baseband signal to create a notch in the first baseband signal between the first portion of the first component of the first baseband signal and a second portion of the first component of the first baseband signal, where the second component of the first baseband signal is located within this notch; and
   b. the receiver further comprises:
      i. means for selecting the second component of the second baseband signal, and
      ii. means for shifting one of a first and a second portions of the first component of second baseband signal to eliminate the notch between the first and second portions of the first component of the second baseband signal.

6. A system as recited in claim 1, in which the first and second components of the first and second baseband signals and the single sideband signal are a voice signal and a data signal containing trunking data, respectively.

7. A system as recited in claim 6, in which the data signal is located approximately in the center of a frequency range occupied by the first baseband signal.

8. A system as recited in claim 1, in which the pilot component of the first baseband signal is located in an uppermost sector of a frequency range occupied by the first baseband signal.

9. A trunked single sideband radio system comprising:
   a. a transmitter having
      i. means for generating a first baseband signal comprising first, second, and pilot components,
      ii. means for modulating the first baseband signal in inverse proportion to the strength of the first component of the first baseband signal, and
      iii. means for generating and transmitting a first single sideband signal comprising first, second, and pilot portions corresponding to the first, second, and pilot components of the modulated first baseband signal;
   b. a repeater having
      i. means for receiving the first single sideband signal,
      ii. means for generating a second baseband signal comprising first, second, and third components corresponding to the first, second, and third portions of the single sideband signal,
      iii. means for correcting the second baseband signal based on the pilot component of the second baseband signal,
      iv. means for generating a third baseband signal having first, second, and pilot portions, where the first portion of the third baseband signal corresponds to the first portion of the corrected second baseband signal, and
      v. means for generating and transmitting a second single sideband signal comprising first, second, and pilot portions corresponding to the first, second, and pilot components of the third baseband signal; and
   c. a receiver having
      i. means for receiving the second single sideband signal,
      ii. means for generating a fourth baseband signal comprising first, second, and third components corresponding to the first, second, and third portions of the second single sideband signal, and
      ii. means for correcting the fourth baseband signal based on the pilot component of the fourth baseband signal.

10. A system as recited in claim 9, in which:
    a. the first component of the first, second, third, and fourth baseband signals and the first portion of the first and second SSB signals carry voice information; and
    b. the second component of the first, second, third, and fourth baseband signals and the second portion of the first and second SSB signals carry carry trunking data information.

11. A system as recited in claim 9, in which:
    a. the transmitter further comprises means for shifting a first portion of the first component of the first baseband signal to create a notch in the first baseband signal between the first portion of the first component of the first baseband signal and a second portion of the first component of the first baseband signal, where the second component of the first baseband signal is located within this notch; and
    b. the receiver further comprises:
       i. means for selecting the second component of the second baseband signal, and
       ii. means for shifting one of a first and a second portions of the first component of second baseband signal to eliminate the notch between the first and second portions of the first component of the second baseband signal.

12. A system as recited in claim 9, in which the repeater and receiver correcting means correct the phase of the second and fourth baseband signals by a multiplication process.

13. A system as recited in claim 9, in which the repeater and receiver correcting means correct the amplitude of the second and fourth baseband signals by dividing the second and fourth baseband signals by the magnitude of the pilot component of the second and fourth baseband signals, respectively.

14. A system as recited in claim 9, further comprising trunking means for generating trunking data for controlling a channel over which the first and second SSB signals are transmitted.

15. A method of transmitting first and second information carrying signals from a first location to a second location, comprising the steps of:
    a. generating at the first location a first baseband signal comprising first, second, and pilot components, the first and second components corresponding to the first and second information carrying signals;
    b. modulating the first baseband signal in inverse proportion to the strength of the first component of the first baseband signal;
    c. generating and transmitting a single sideband signal comprising first, second, and pilot portions corresponding to the first, second, and pilot components of the modulated first baseband signal;
    d. generating at the second location a second baseband signal comprising first, second, and third components corresponding to the first, second, and third portions of the single sideband signal; and e. correcting the second baseband signal based on the pilot component of the second baseband signal.

16. A method as recited in claim 14, in which the step of correcting the second baseband signal comprises the step of correcting the phase of the second baseband signal by a multiplication process.

17. A method as recited in claim 14, in which the step of correcting the second baseband signal comprises the step of correcting the amplitude of the second baseband signal by dividing the second baseband signal by the magnitude of the pilot component of the second baseband signal.

18. A method as recited in claim 14, further comprising the steps of:
   a. shifting a first portion of the first component of the first baseband signal to create a notch in the first baseband signal between the first portion of the first component of the first baseband signal and a second portion of the first component of the first baseband signal
   b. locating the second component of the first baseband signal within the notch created in the first component of the first baseband signal;
   c. shifting one of a first and a second portions of the first component of second baseband signal to eliminate a notch between the first and second portions of the first component of the second baseband signal corresponding to the notch created in the first baseband signal.

19. A method as recited in claim 15, further comprising the step of generating trunking data for controlling a channel over which the single sideband signal is transmitted, where the first and second information carrying signals are a voice signal and a data signal containing trunking data, respectively.

20. A method as recited in claim 19, further comprising the step of locating the data signal approximately in the center of a frequency range occupied by the first baseband signal.

21. A method as recited in claim 15, further comprising the step of locating the pilot component of the first baseband signal in an uppermost sector of a frequency range occupied by the first baseband signal.

22. An apparatus as recited in claim 1, in which:
   a. the receiver further comprises
      i. voltage controlled means for generating a mixing signal,
      ii. means for generating a voltage signal for controlling the mixing signal generating means according to a voltage value,
      iii. means for storing a predetermined voltage value corresponding to an initial setting of the voltage signal,
      iv. means for generating an error signal based on a comparison of the second baseband signal with the mixing signal, and
      v. means for generating a new voltage value based on the error signal and storing the new voltage value in the memory means; and
   b. the means for generating the second baseband signal generates the second baseband signal based on the mixing signal.

23. An apparatus as recited in claim 22, in which the predetermined voltage value is initially stored in first and second locations in the memory means and the value in the second memory location is subsequently replaced with the new voltage value, further comprising means for generating a service signal based on a comparison of the values of the first and second locations.

24. An apparatus as recited in claim 22, in which the error signal corresponds to a difference between the baseband signal and the mixing signal.

25. An apparatus as recited in claim 24, in which the new voltage value corresponds to the sum of the voltage signal and the error signal.

26. A receiver for a single sideband radio system comprising:
   a. a transmitter having a stable frequency source for generating a single sideband signal; and
   b. a receiver having
      i. means for receiving the single sideband signal,
      ii. means for generating a baseband signal based on the single sideband signal and a mixing signal,
      iii. voltage controlled means for generating the mixing signal,
      iv. means for generating a voltage signal for controlling the mixing signal generating means according to a voltage value,
      v. memory means for storing a predetermined voltage value corresponding to an initial setting of the voltage signal,
      vi. means for generating an error signal based on a comparison of the second baseband signal with the mixing signal, and
      vii. means for generating a new voltage value based on the error signal and storing the new voltage value in the memory means.

27. An apparatus as recited in claim 22, in which the predetermined voltage value is initially stored in first and second locations in the memory means and the value in the second memory location is subsequently replaced with the new voltage value, further comprising means for generating a service signal based on a comparison of the values in the first and second locations.

28. An apparatus as recited in claim 22, in which the error signal corresponds to a difference between the baseband signal and the mixing signal.

29. An apparatus as recited in claim 24, in which the new voltage value corresponds to the sum of the voltage signal and the error signal.

* * * * *